US011244349B2

(12) United States Patent
Rangasamy Kannadasan et al.

(10) Patent No.: US 11,244,349 B2
(45) Date of Patent: Feb. 8, 2022

(54) METHODS AND APPARATUS FOR DETECTION OF SPAM PUBLICATION

(71) Applicant: eBay Inc., San Jose, CA (US)

(72) Inventors: Manojkumar Rangasamy Kannadasan, Santa Clara, CA (US); Ajinkya Gorakhnath Kale, San Jose, CA (US)

(73) Assignee: eBay Inc., San Jose, CA (US)

( * ) Notice: Subject to any disclaimer, the term of this patent is extended or adjusted under 35 U.S.C. 154(b) by 533 days.

(21) Appl. No.: 14/983,074

(22) Filed: Dec. 29, 2015

(65) Prior Publication Data
US 2017/0186032 A1   Jun. 29, 2017

(51) Int. Cl.
*G06Q 30/02* (2012.01)
*G06Q 30/06* (2012.01)
*G06K 9/62* (2006.01)
*G06K 9/46* (2006.01)
*H04L 29/06* (2006.01)

(52) U.S. Cl.
CPC ....... *G06Q 30/0248* (2013.01); *G06K 9/4652* (2013.01); *G06K 9/4671* (2013.01); *G06K 9/627* (2013.01); *G06Q 30/06* (2013.01); *G06Q 30/0625* (2013.01); *H04L 63/1425* (2013.01)

(58) Field of Classification Search
CPC .................................. G06Q 30/0207–30/0277
USPC ................................................... 705/14, 319
See application file for complete search history.

(56) References Cited

U.S. PATENT DOCUMENTS

| 7,117,358 B2* | 10/2006 | Bandini ................ H04L 51/12 713/153 |
| 2002/0199095 A1 | 12/2002 | Bandini et al. |
| 2005/0071255 A1 | 3/2005 | Wang et al. |
| 2008/0208714 A1 | 8/2008 | Sundaresan |

(Continued)

FOREIGN PATENT DOCUMENTS

| CN | 102339289 A | 2/2012 |
| CN | 103458300 A | 12/2013 |

(Continued)

OTHER PUBLICATIONS

Karpathy, Andrej et al., Deep Visual-Semantic Alignments for Generating Image Descriptions (Year: 2014).*

(Continued)

*Primary Examiner* — Luis A Brown
*Assistant Examiner* — Richard G Reinhardt
(74) *Attorney, Agent, or Firm* — Faegre Drinker

(57) ABSTRACT

In various example embodiments, a system and method for determining a spam publication using a spam detection system are presented. The spam detection system receives, from a device, an image of an item and an item attribute for the item. Additionally, the spam detection system extracts an image attribute based on the received image, and compares the item attribute and the image attribute. Moreover, the spam detection system calculates a confidence score based on the comparison. Furthermore, the spam detection system determines that the item attribute is incorrect based on the confidence score transgressing a predetermined threshold. In response to the determination that the item attribute is incorrect, the spam detection system causes presentation, on a display of the device, of a notification.

19 Claims, 9 Drawing Sheets

(56) References Cited

U.S. PATENT DOCUMENTS

| | | | |
|---|---|---|---|
| 2008/0313059 A1* | 12/2008 | Martinek | G06Q 10/08 |
| | | | 705/28 |
| 2010/0102515 A1 | 4/2010 | Miyazawa et al. | |
| 2012/0120248 A1 | 5/2012 | Han et al. | |
| 2013/0066765 A1* | 3/2013 | Oppenheimer | G06Q 20/382 |
| | | | 705/38 |
| 2013/0076726 A1* | 3/2013 | Ferrara | G06T 11/00 |
| | | | 345/418 |
| 2013/0084002 A1* | 4/2013 | Bhardwaj | G06Q 30/0643 |
| | | | 382/165 |
| 2013/0215116 A1* | 8/2013 | Siddique | G06Q 30/0643 |
| | | | 345/420 |
| 2013/0262193 A1* | 10/2013 | Sundaresan | G06Q 10/10 |
| | | | 705/12 |
| 2014/0125800 A1 | 5/2014 | Van Nest et al. | |
| 2014/0182889 A1 | 7/2014 | Shin et al. | |
| 2014/0365382 A1* | 12/2014 | Rubinstein | H04L 51/32 |
| | | | 705/309 |
| 2015/0286898 A1* | 10/2015 | Di | G06K 9/46 |
| | | | 382/224 |
| 2015/0348045 A1* | 12/2015 | Agarwal | G06K 9/00248 |
| | | | 705/44 |
| 2016/0078507 A1* | 3/2016 | Shivaswamy | G06Q 30/0605 |
| | | | 705/26.2 |
| 2017/0046768 A1* | 2/2017 | Kumari | G06Q 30/0631 |

FOREIGN PATENT DOCUMENTS

| | | |
|---|---|---|
| CN | 104866468 A | 8/2015 |
| CN | 108431854 | 8/2018 |
| KR | 10-2006-0095553 A | 8/2006 |
| KR | 1020067006205 | 8/2006 |
| KR | 1020090029145 | 3/2009 |
| WO | WO-2017117194 A1 | 7/2017 |

OTHER PUBLICATIONS

"International Application Serial No. PCT/US2016/068831, International Search Report dated Feb. 21, 2017", 5 pgs.

"International Application Serial No. PCT/US2016/068831, Written Opinion dated Feb. 21, 2017", 6 pgs.

Karpathy, Andrej, et al., "Deep visual-semantic alignments for generating image descriptions", 2015 IEEE Conference On Computer Vision and Pattern Recognition (CVPR), IEEE, XP032793761, DOI: 10.1109/CVPR.2015.7298932, (Jun. 7, 2015).

"International Application Serial No. PCT US2016 068831, International Preliminary Report on Patentability dated Jul. 12, 2018", 7 pages.

Response to Communication Pursuant to Rules 161(1) and 162 EPC filed on Feb. 7, 2019, for European Patent Application No. 16826641. 9, dated Aug. 7, 2018, 8 pages.

Office Action received for Korean Patent Application No. 10-2018-7021829 dated Jan. 17, 2020, 9 Pages (5 pages of Official Copy and 4 pages of English Translation).

Response to Office Action filed on Mar. 17, 2020, for Korean Patent Application No. 10-2018-7021829, dated Jan. 17, 2020, 17 pages (14 pages of Official copy & 3 pages of English translation of claims).

Communication Pursuant to Rule 94(3) received for European Patent Application No. 16826641.9, dated Feb. 14, 2020, 5 pages.

Response to Communication Pursuant to Article 94(3) filed on Apr. 24, 2020, for European Patent Application No. 16826641.9, dated Feb. 14, 2020, 9 Pages.

Office Action received for Korean Patent Application No. 10-2020-7027894 dated Jun. 3, 2021, 7 Pages(3 Pages of English translation & 4 Pages of official Copy Only).

Summons To Attend Oral Proceeding Received for European Patent Application No. 16826641.9, mailed , Apr. 6, 2021, 3 Pages.

Office Action received for Korean Patent Application No. 10-2020-7027894 dated Dec. 16, 2020, Dec. 16, 2020, 9 pages (4 pages of Official Copy and 5 pages of English Translation).

Summons To Attend Oral Proceeding Received for European Patent Application No. 16826641.9, mailed Dec. 21, 2020, 8 pages.

Office Action recieved for Chinese Patent Application No. 201680076869.1 dated Sep. 17, 2021, 20 Pages (10 Pages of English Translation & 10 Pages of Official Copy).

* cited by examiner

METHODS AND APPARATUS FOR DETECTION OF SPAM PUBLICATION

TECHNICAL FIELD

Embodiments of the present disclosure relate generally to the technical field of data processing, specifically, determining accuracy of publications. More particularly, but not by way of limitation, techniques to detect spam publications are described.

BACKGROUND

Conventionally, a publication can be listed on an online marketplace. In some instances, a publication can be an item listing in the online marketplace. The online marketplace can provide listing services for items to be purchased and sold. For example, a seller can list an item for sale on the marketplace. Additionally, a buyer can browse a website of the online marketplace and purchase an item.

The online marketplace can allow a seller to list an item by uploading images of the item on the online marketplace, inputting item attributes for the item, and inputting other product information about the item. An item with accurate item attributes (e.g., product information) and accurate images can have a higher likelihood of being sold.

BRIEF DESCRIPTION OF THE DRAWINGS

Various ones of the appended drawings merely illustrate example embodiments of the present disclosure and cannot be considered as limiting its scope.

DETAILED DESCRIPTION

Figure 1:
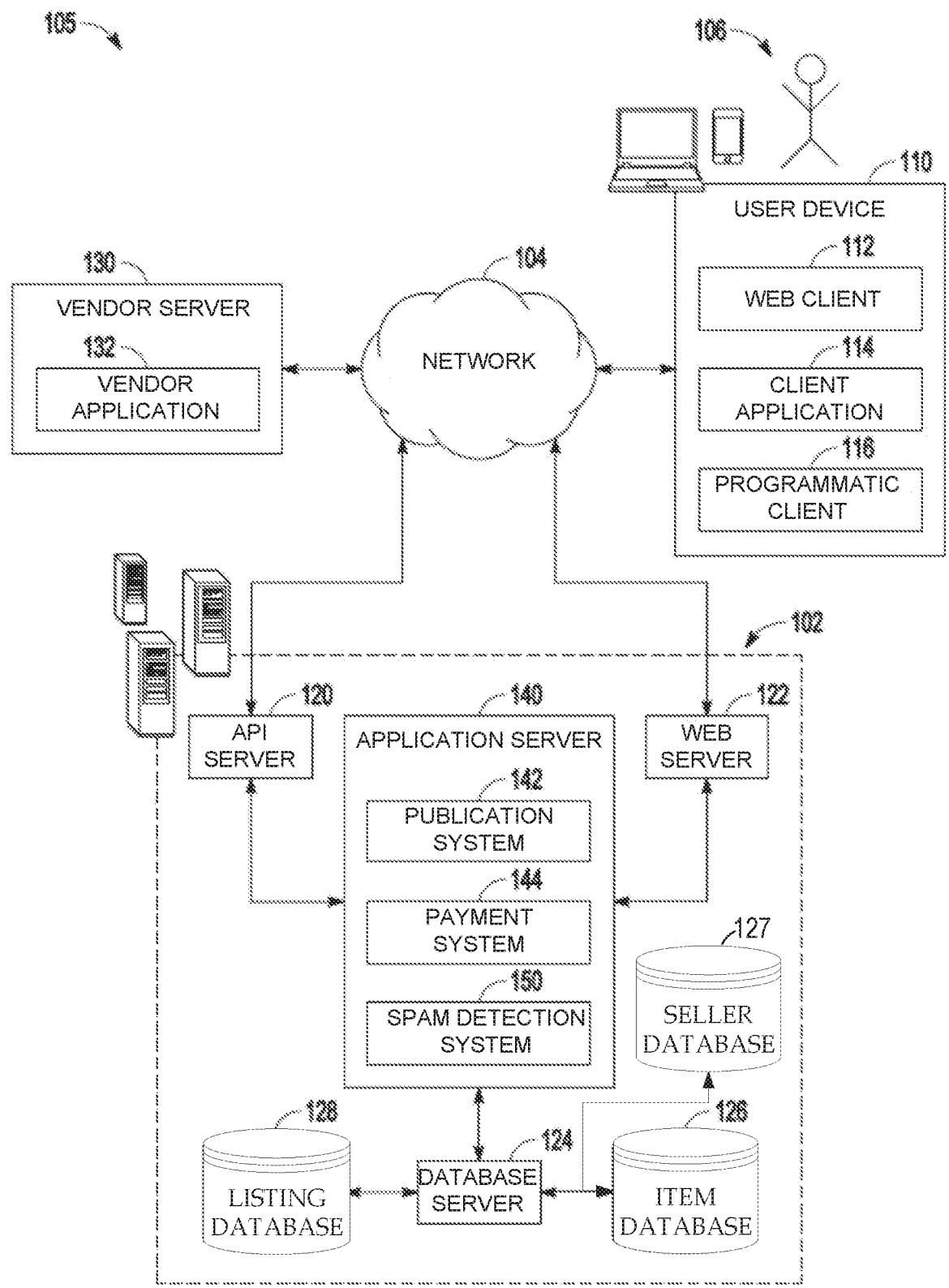
FIG. 1 is a block diagram illustrating a networked system, according to some example embodiments.

The description that follows includes systems, methods, techniques, instruction sequences, and computing machine program products that embody illustrative embodiments. In the following description, for the purposes of explanation, numerous specific details are set forth in order to provide an understanding of various embodiments of the subject matter discussed herein. It will be evident, however, to those skilled in the art, that embodiments of the inventive subject matter may be practiced without these specific details. In general, well-known instruction instances, protocols, structures, and techniques are not necessarily shown in detail.

According to some embodiments, a publication system includes publications that have been created by a user of the publication system. The user can publish content on the publication system. For example a seller can list an item for sale in the publication system by generating an item listing. The item listing is an example of a publication. The seller can commence the selling experience in the online marketplace by listing items e.g., products) for sale. The seller can select a product category of items from a predefined list of category hierarchy specified by the online marketplace. The product categories in the online marketplace can represent an organization of the product listings in a grouped hierarchical taxonomy. Additionally, in some instances, after the category selection, the seller enters a product title, description, or item attribute (e.g., brand, model, color, style). Furthermore, the seller can upload an image of the item, and select a price at which to offer the sell the item for sale.

Once the item is listed, the item can be available for users to search and purchase from the online marketplace. A shopping experience for a buyer can commence by either issuing a search query or by browsing through the product catalog of the online marketplace. The buyer can see the list of items matching their criteria in either case, which can be referred to as a finding attempt. In some instances, the buyer can use a query with free form text to input a search criteria. The search criteria can be by an application server to present a search result. The search criteria can include the buyer's location, a product category, product attributes, brand, color, and so on. Based on the search criteria, the product listings are retrieved by the application server from a repository or storage index. Additionally, the product listing can be ranked based on various factors present in the search context (e.g., search criteria), and the ranked product listings are displayed to the user as an ordered list in the search results page.

In some instances, a search results page can also be considered as a list of condensed versions of product description pages. For example, a buyer can navigate to the product description page by clicking on one of the product listings present in the search result page. The buyer can navigate back and forth between the search results page and the product description page for a given search context.

In a conventional online marketplace, a spam listing is simply identified when duplicate listings are entered by the same seller. The online marketplace tries to either prevent the seller from listing the same item or demotes the items' ranking in the search results page.

Furthermore, although a majority of the sellers provide valid information about the product, there is a certain percentage of sellers that unintentionally or intentionally provide inaccurate information for an item listed for sale. A spam item listing can include any item listing with incorrect, misleading, or fake product information.

Three different examples of spam item listings can occur in an online marketplace when a seller unintentionally or intentionally provides inaccurate information for an item listed for sale. In the first example, a seller posts a picture of Brand X and fill out the product information with Brand Y, thereby manipulating or exploiting the search engine to return the item when a buyer searches for Brand Y. In the second example, the seller uploads a wrong image of a product accessory of a product, while actually providing product information about the product. In the third example, the seller lists a product accessory in the category of the actual product. Continuing with the third example, the seller can list a smartphone case for sale in the actual smartphone category instead of listing the item in the smartphone case category.

According to some embodiments, techniques described herein can reduce incorrect listings by introducing a spam detection framework (e.g., spam detection system). The spam detection framework can use item images received at a time of listing an item to validate item attributes for the item. Additionally, based on a determination from the spam detection framework, a search ranking associated with the listed item can be modified. The search ranking can be used to return a search result based on a search request from a user.

In some instances, the spam detection framework extracts information from the images uploaded by the seller, and uses machine learning and natural language processing techniques to determine image attributes from the uploaded image. The image attributes can be compared with the item attributes (e.g., product description) that have been inputted by the seller. Additionally, the spam detection framework can calculate a confidence score which signifies the likelihood that the item attribute is incorrect (e.g., spam).

The confidence score can signify an overlap of item attribute and image attribute. Additionally, the confidence score can be used to classify the item as either spam or not spam based on the extracted image attribute and the item attribute provided by the seller. For example, when the confidence score transgresses a predetermined threshold (e.g., confidence score is higher than a predetermined threshold, confidence score is lower than a predetermined threshold), then the overlap of the item attribute and image attribute is low, which increases the likelihood that the item attribute is incorrect. Furthermore, when the confidence score is high, then the item can be marked as a spam listing.

With reference to FIG. 1, an example embodiment of a high-level client-server-based network architecture 105 is shown. A networked system 102, in the example form of a network-based publication system 142 or payment system 144, provides server-side functionality via a network 104 (e.g., the Internet or wide area network (WAN)) to one or more user device 110 (also referred to as a "client device"). FIG. 1 illustrates, for example, a web client 112, client application 114, and a programmatic client 116 executing on user device 110. One or more portions of the network 104 may be an ad hoc network, an intranet, an extranet, a virtual private network (VPN), a local area network (LAN), a wireless LAN (WLAN), a wide area network (WAN), a wireless WAN (WWAN), a metropolitan area network (MAN), a portion of the Internet, a portion of the Public Switched Telephone Network (PSTN), a cellular telephone network, a wireless network, a WiFi network, a WiMax network, another type of network, or a combination of two or more such networks.

The user device 110 may comprise, but is not limited to, a mobile phone, desktop computer, laptop, portable digital assistant (PDA), smart phone, tablet, ultra-book, netbook, laptop, multi-processor system, microprocessor-based or programmable consumer electronic, game console, set-top box, or any other communication device that a user may utilize to access the networked system 102. In some embodiments, the user device 110 may comprise a display module to display information (e.g., in the form of user interfaces). In further example embodiments, the user device 110 may comprise one or more of a touch screen, accelerometer, gyroscope, camera, microphone, global positioning system (GPS) device, and so forth. The user device 110 may be a device that is used by a user 106 to perform a transaction involving items within the networked system 102. In one embodiment, the networked system 102 is a network-based marketplace that responds to requests for product listings, publishes publications comprising product listings (e.g., item listings) of products available on the network-based marketplace, and manages payments for these marketplace transactions.

Each user device 110 may include one or more applications (also referred to as "apps") such as, but not limited to, a web browser, messaging application, electronic mail (email) application, an e-commerce site application (also referred to as a marketplace application), and the like. In some embodiments, if the e-commerce site (e.g., online marketplace) application is included in a given user device 110, then this application is configured to locally provide the user interface and at least some of the functionalities with the application configured to communicate with the networked system 102, on an as-needed basis, for data or processing capabilities not locally available (e.g., access to a database of items available for sale, to authenticate a user, or to verify a method of payment). Conversely, if the e-commerce site application is not included in the user device 110, the user device 110 may use its web browser to access the e-commerce site (or a variant thereof) hosted on the networked system 102.

One or more users 106 may be a person, a machine, or other means of interacting with the user device 110. In example embodiments, the user 106 is not part of the network architecture 105, but may interact with the network architecture 105 via the user device 110 or other means. For instance, the user 106 provides input (e.g., touch screen input or alphanumeric input) to the user device 110 and the input is communicated to the networked system 102 via the network 104. In this instance, the networked system 102, in response to receiving the input from the user 106, communicates information to the user device 110 via the network 104 to be presented to the user 106. In this way, the user 106 interacts with the networked system 102 using the user device 110.

An application program interface (API) server 120 and a web server 122 are coupled to, and provide programmatic and web interfaces respectively to, one or more application server 140. The application server 140 hosts the publication system 142 the payment system 144, and a spam detection system 150, each of which may comprise one or more modules or applications and each of which may be embodied as hardware, software, firmware, or any combination thereof. The application server 140 is, in turn, shown to be coupled to one or more database server 124 that facilitates access to information storage repositories (e.g., item database 126, seller database 127, listing database 128, offline ranking database). In some instances, the database server 124 can access an offline ranking database as later described in FIG. 6.

In some instances, the listing database 128 is a storage device that stores information to be posted (e.g., publications or listings) to the publication system 142. The listing database 128 comprises information for items currently listed on the online marketplace such as historical price data, in accordance with example embodiments.

The item database 126 can include item attributes for a specific item. For example, the item database 126 can include product information and a product description for the specific item.

The seller database 127 stores seller information of each seller in the online marketplace. The seller information can include a seller's rating based on previous transactions, a number of positive feedback received by the seller, a number of negative feedback received, communication messages with buyers or potential buyers, a number of items previously sold, a number of items correctly shipped, a number of refunds requested or given, or other derived information. For example, other derived information can include a sentiment analysis based on buyer's feedback. The sentiment analysis can be based on text recognition techniques used to determine the buyer's feedback.

Additionally, a vendor application 132, executing on one or more vendor server 130, is shown as having programmatic access to the networked system 102 via the programmatic interface provided by the API server 120. For example, the vendor application 132, utilizing information retrieved from the networked system 102, supports one or more features or functions on a website hosted by the vendor. The vendor website, for example, provides one or more promotional, marketplace, or payment functions that are supported by the relevant applications of the networked system 102.

The publication system 142 provides a number of publication functions and services to a user 106 that access the networked system 102. The payment system 144 likewise provides a number of functions to perform or facilitate payments and transactions. While the publication system 142 and payment system 144 are shown in FIG. 1 to both form part of the networked system 102, it will be appreciated that, in alternative embodiments, each system 142 and 144 may form part of a service that is separate and distinct from the networked system 102. In some embodiments, the payment system 144 may form part of the publication system 142.

The spam detection system 150 provides functionality operable to perform various spam detection techniques using image information extracted from an image of the item listed in a publication. For example, the spam detection system 150 receives an image of the item, and extracts an image attribute from the receive image. Using the extracted image attribute, the spam detection system 150 determines whether the item attribute inputted by the seller is accurate or inaccurate. Some of the information to determine the accuracy of the item attribute can be obtained from the item database 126, the seller database 127, the listing database 128, or the vendor server 130.

Additionally, the spam detection system 150 provides notification services corresponding to events. For example, the spam detection system 150 can send a notification to the user 106 based on a determination that the item attribute is incorrect. The item attribute can be incorrect when the calculated confidence score associated with the item attribute transgresses a predetermined threshold. Accordingly, in response to detecting a notification event (e.g., when the confidence score transgresses a predetermined threshold), the spam detection system 150 provides a notification message to the user device 110 associated with the user 106. In example embodiments, the notification message includes a textual, graphical, or audible message that provides a notice to the user 106 to update the item attribute or the item listing information.

Further, while the client-server-based network architecture 100 shown in FIG. 1 employs a client-server architecture, the present subject matter is of course not limited to such an architecture, and could equally well find application in a distributed, or peer-to-peer, architecture system, for example. Publication system 142, payment system 144, or spam detection system 150 could also be implemented as standalone software programs, which do not necessarily have networking capabilities. For example, the spam detection system 150 can determine an incorrect item attribute without access to the application server 140 when the spam detection system 150 does not have networking capabilities.

In example embodiments, the web client 112 accesses the spam detection system 150 via the web interface supported by the web server 122. Similarly, the programmatic client 116 accesses the various services and functions provided by the spam detection system 150 via the programmatic interface provided by the API server 120. The programmatic client 116 may, for example, be a seller application (e.g., the Turbo Lister application developed by eBay® Inc., of San Jose, Calif.) to enable sellers to author and manage listings on the networked system 102. In an off-line manner, and to perform batch-mode communications between the programmatic client 116 and the networked system 102.

Figure 2:
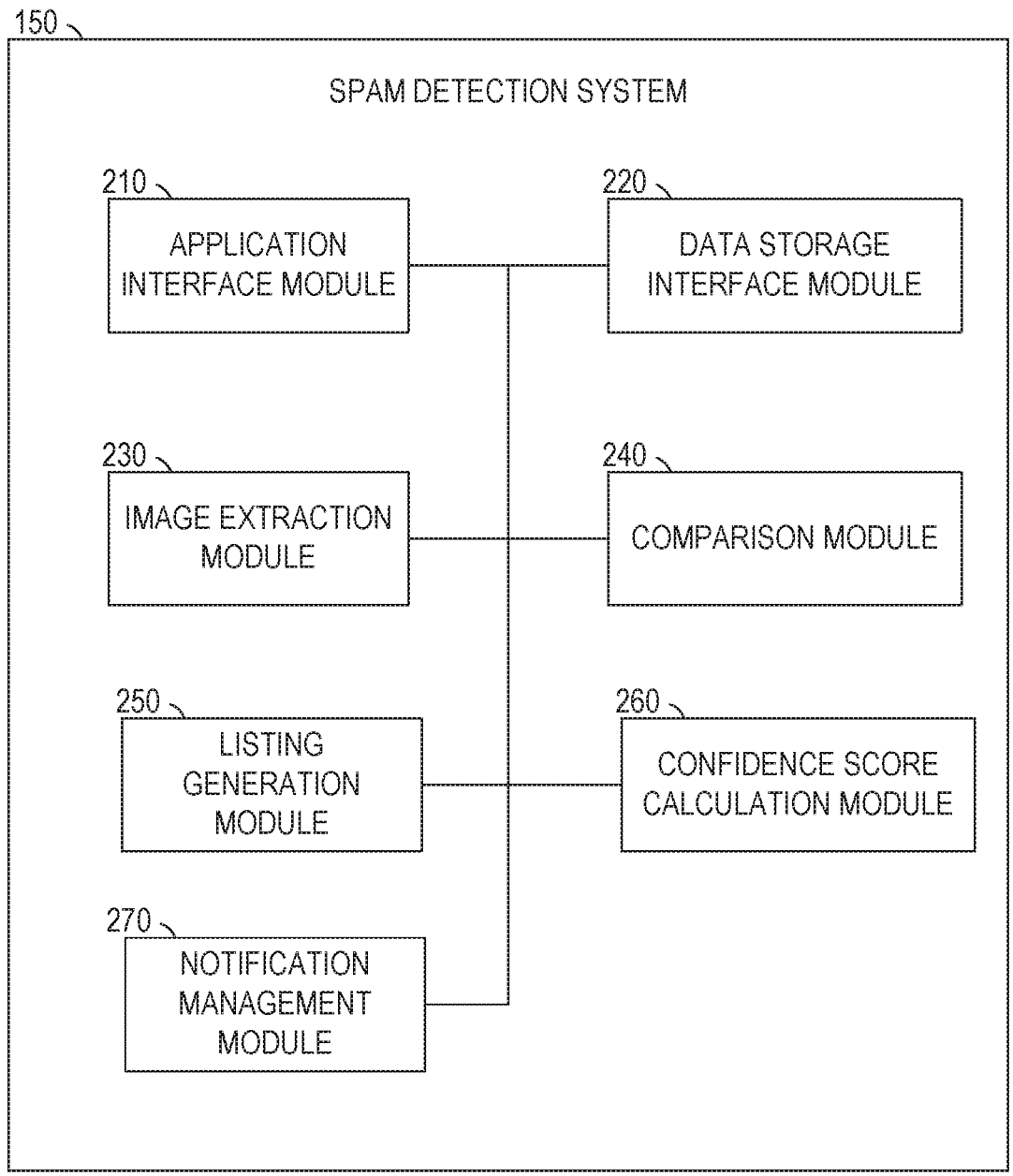
FIG. 2 is a block diagram illustrating an example embodiment of the spam detection system of FIG. 1 including multiple modules forming at least a portion of the client-server system of FIG. 1.

FIG. 2 is a block diagram illustrating an example embodiment of the spam detection system 150 of FIG. 1 including multiple modules forming at least a portion of the network architecture 100 of FIG. 1. The modules 210-270 of the illustrated spam detection system 150 include an application interface module 210, a data storage interface module 220, an image extraction module 230, a comparison module 240, a listing generation module 250, a confidence score calculation module 260, and a notification management module 270. In some embodiments, the components of the spam detection system 150 are included in the application server 140 of FIG. 1. However, it will be appreciated that in alternative embodiments, one or more components of the spam detection system 150 described below are included, additionally or alternatively, in other devices, such as one or more of the user device 110 or the vendor server 130 of FIG. 1. It will also be appreciated that the spam detection system 150 is deployed in systems other than online marketplaces.

The modules 210-270 of the spam detection system 150 are hosted on dedicated or shared server machines that are communicatively coupled to enable communications between server machines. One or more of the modules 210-270 are deployed in one or more datacenters. Each of the modules 210-270 is communicatively coupled to the other modules 210-270 and to various data sources, so as to allow information to be passed between the modules 210-270 of the spam detection system 150 or so as to allow the modules 210-270 to share and access common data.

The application interface module 210 is a hardware-implemented module that facilitates communication of data between the spam detection system 150 and the user device 110, the vendor server 130, and other devices connected to the network 104. In particular, the application interface module 210 provides a user-facing graphical user interface (GUI) for interfacing with one or more user devices 110, thus providing a bi-directional interface. For example, the application interface module 210 interfaces with the API server 120 to provide a programmatic interface to user device 110 or to provide a web interface to the user device 110. As such, the application interface module 210 facilitates the providing of functions, webpages, data, code, or other web resources between the spam detection system 150 and the user device 110.

In operation, the spam detection system 150 receives data from the one or more user devices 110 (e.g., via the application interface module 210). The received data from the user devices 110 correspond to a number of inputs or requests related to, for example, images, item attributes, other item information; authentication; creating or editing user accounts; adding, removing, or editing the listing database 128; or sharing data (e.g., sharing selected items or notifications), as described below in greater detail.

The data storage interface module 220 is a hardware-implemented module that facilitates accessing data for the spam detection system 150. In an example embodiment, the data storage interface module 220 interfaces with the item database 126, the seller database 127, and listing database 128 of FIG. 1 to access one or more user accounts, vendor accounts, previously listed items, or currently listed items.

The image extraction module 230 is a hardware-implemented module that extracts image attributes from a received image. The extraction techniques are further described in FIGS. 3, 4, and 8. In operation, the image extraction module 230 receives an image associated with an item listed for sale from a device, such as, but not limited to, the user device 110 or the vendor server 130 of FIG. 1.

The comparison module 240 is a hardware-implemented module that compares the extracted image attribute with the item attribute received from the seller to determine the accuracy of the item listing. The comparison techniques are further described in FIGS. 3-8. In operation, the comparison module 240 receives an item attribute from user device 110 and an image attribute from the image extraction module 230 to perform a comparison.

Figure 7:
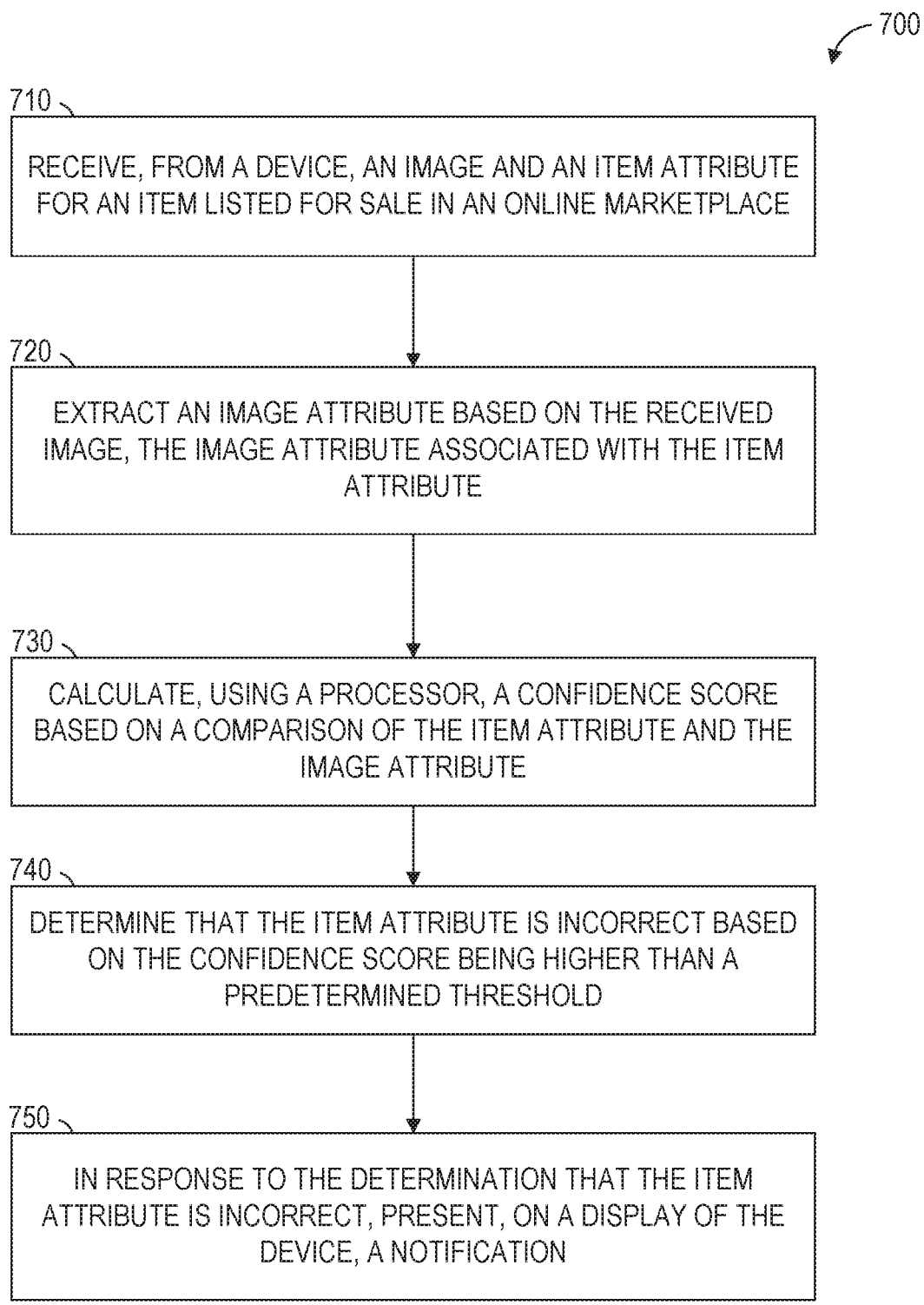
FIG. 7 is a flowchart illustrating an example method of determining the accuracy of information associated with an item listed for sale, according to some embodiments.

The listing generation module 250 is a hardware-implemented module that facilitates the automatic generation of a listing on the online marketplace. Based on a received indication to update an incorrect item attribute or a determination that the item listing is not spam, the listing generation module 250 generates the listing for the item on the online marketplace. FIG. 7 further describes actions performed by the listing generation module 250.

The confidence score calculation module 260 is a hardware-implemented module that calculates a confidence score based on the comparison performed by the comparison module 240. The confidence score calculation module 260 can also rank item listings in the online marketplace in response to a search request. Techniques for the confidence score calculation are further described in FIG. 7 and FIG. 8.

The notification management module 270 is a hardware-implemented module that facilitates providing user notifications related to a determination that an item attribute is incorrect or an item listing is spam. In operation, the notification management module 270 sends a notification to the user device 110 to update the item listing or an item attribute based on the determination. Once an indication is received from the user device 110 to update the item listing or item attribute, the notification management module 270 signals, to the listing generation module 250, to list the item listing with the correct item attribute in the online marketplace.

Detection of Spam Listing

Conventional spam detection techniques are based on item text information and a category in which the item is listed. However, conventional spam detection techniques may not be able to filter out misattributed products. Additionally, potential discrepancy between the item image and the item attribute may not be resolved using conventional spam detection techniques based on item text information.

Figure 3:
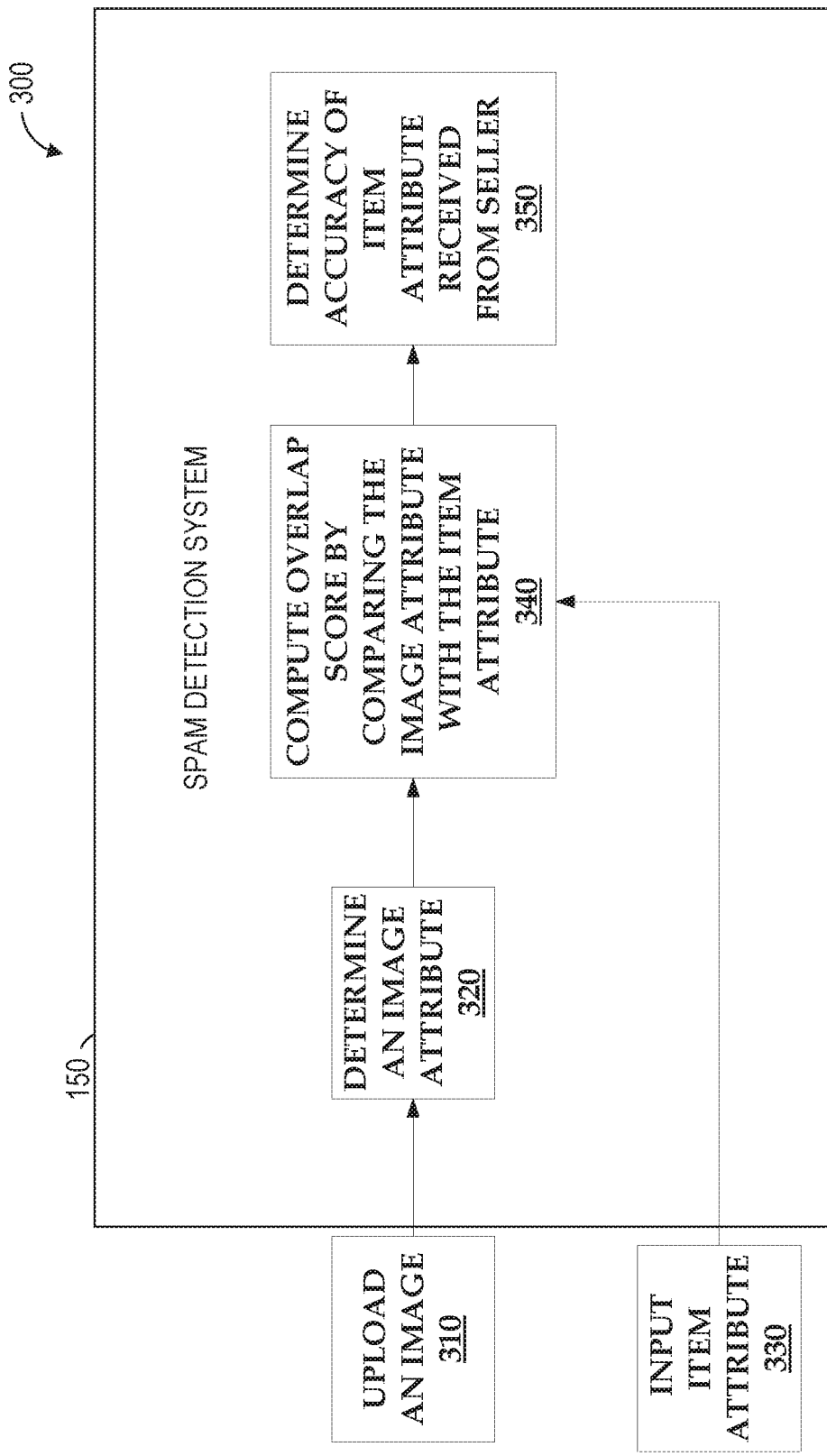
FIG. 3 illustrates an example process diagram of determining the accuracy of an item attribute using the spam detection system, according to some embodiments.

FIG. 3 illustrates an example process 300 of determining the accuracy of an item attribute using the spam detection system 150, according to some embodiments. In example embodiments, a spam listing is identified by comparing a determined an image attribute and a received item attribute sent by the seller. At operation 310, the user (e.g., seller) can upload an image to commence the selling process. The spam detection system 150, using the image extraction module 230, receives the uploaded image from the seller, and determines (e.g., extracts) the image attribute 320 from the uploaded image. Additionally, in some instances, the spam detection system 150, using the application interface module 210, can receive an item attribute from the seller at operation 330. For example, the seller can input the item attribute when generating the publication.

In example embodiments, the image attribute determined at operation 320 is obtained using an image extraction technique. The image extraction technique can include using a scale-invariant feature transform (SIFT) algorithm technique, using an image gradient technique, machine vision algorithms (e.g., ImageNet), or using an image database. The image attribute can correspond to item attributes for the item listed for sale.

In example embodiments, the spam detection system 150, using the comparison module 240, determines the accuracy of the item attribute provided by the seller by comparing the item attribute with the extracted image attribute, at operation 340. The image attribute can include product attributes, item title, item description, item color, item brand, and so on that has been determined by the image extraction module 230 at operation 320. The image attribute can be determined (e.g., predicted) using a pre-trained language model. Examples of a pre-trained language model includes a recurrent neural networks (RNN) model, a long-short term memory (LSTM) model, hidden markov model (HMM), and so on. Additionally, the image attribute can include an item category associated with the item. The pre-trained language model can predict the item category based on pre-trained classifiers, such as a convolutional neural networks (CNN) model, support vector machines (SVM), or a logistic regression model.

Similarly, the item attribute can include product attributes, item title, item description, item color, item brand, and so on that has been entered by the seller.

Furthermore, using the comparison of the image attribute and the item attribute, the spun detection system 150 determines (e.g., predict) whether an item listing is spam or the item attribute received from a seller is incorrect. In some instance, the determination of the accuracy of the listing using the item attribute and the image attribute is based on a confidence score (e.g., overlap score) computed at operation 340. The confidence score can be computed by the confidence score calculation module 260 in FIG. 2. The confidence score (e.g., overlap score) can be computed by comparing the image attribute with the item attribute. The comparison and confidence score computation can be based on either basic similarity measures or a machine-learned classifier. The basic similarity measures can include cosine similarity, hashing functions, Jaccard similarity, and so on. As previously mentioned, the machine-learned classifier can be based on a SVM model, logistic regression model, a neural networks model, and so on.

Subsequently, using the confidence score, the spam detection system 150 can determine the accuracy of the item attribute received from seller at operation 350. For example, the item attribute is determined to be inaccurate when the confidence score transgresses (e.g., is higher than, is lower than) a predetermined threshold.

Moreover, the spam detection system 150 is trained to identify a type of spam present in the listed item, such as an accessory pollution, a misattribution of item, or incorrect image for the item based on machine learning models. The process of training the machine learning models used in by the spam detection system 150 is further described in FIG. 4.

Figure 4:
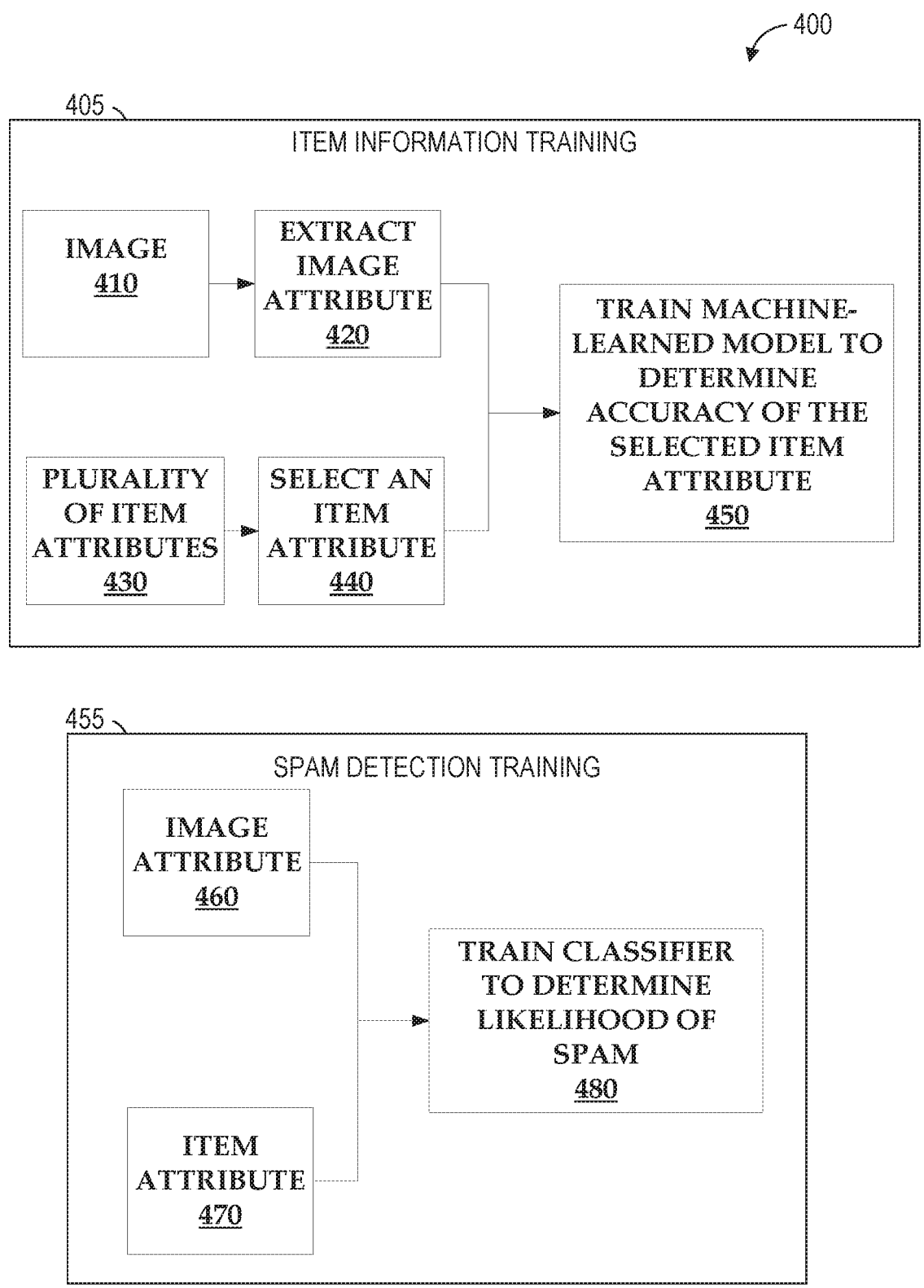
FIG. 4 illustrates example processes for training the machine learning models by the spam detection system, according to some embodiments.

FIG. 4 illustrates example processes 400 for training the machine learning models by the spam detection system 150, according to some embodiments. The processes 400 includes item attribute accuracy training 405 and spam detection training 455.

In the item information training 405 example, the spam detection system 150 extracts an image attribute 420 from the image 410. As previously mentioned, the image 410 can be uploaded by the seller when creating the item listing. Additionally, the spam detection system 150 selects an item attribute 440 from the plurality of item attributes 430. As previously mentioned, the plurality of item attributes can be inputted by the user when generating the publication. For example, the item attribute can be entered by the seller when creating the item listing. Subsequently, the spam detection system 150 trains the machine-learned model to determine the accuracy of the selected item attribute at operation 450. For example, the extracted image attribute can be a logo for a first brand name, and the selected item attribute can be a second brand name. Given that the first brand name is different than the second brand name, then the spam detection system 150 can determine that he selected item attribute is incorrect. Alternatively, the extracted image attribute can be a logo for a first brand name, and the selected item attribute can be the first brand name. Given that the extracted image attribute and the selected item attribute is the same, then the spam detection system 150 can determine that he selected item attribute is correct.

In the spam detection training 455 example, the spam detection system 150 receives an image attribute at operation 460. Additionally, the spam detection system 150 receives an item attribute at operation 470. Subsequently, the spam detection system 150 trains a classifier to determine a likelihood that the item listing is spam or that the item attribute is incorrect at operation 480. In some instances, the spam detection system 150 can use similarity measurement techniques to determine the likelihood that the item listing is spam or that the item attribute is incorrect.

Incorporating the Framework in e-Commerce Platform

Figure 5:
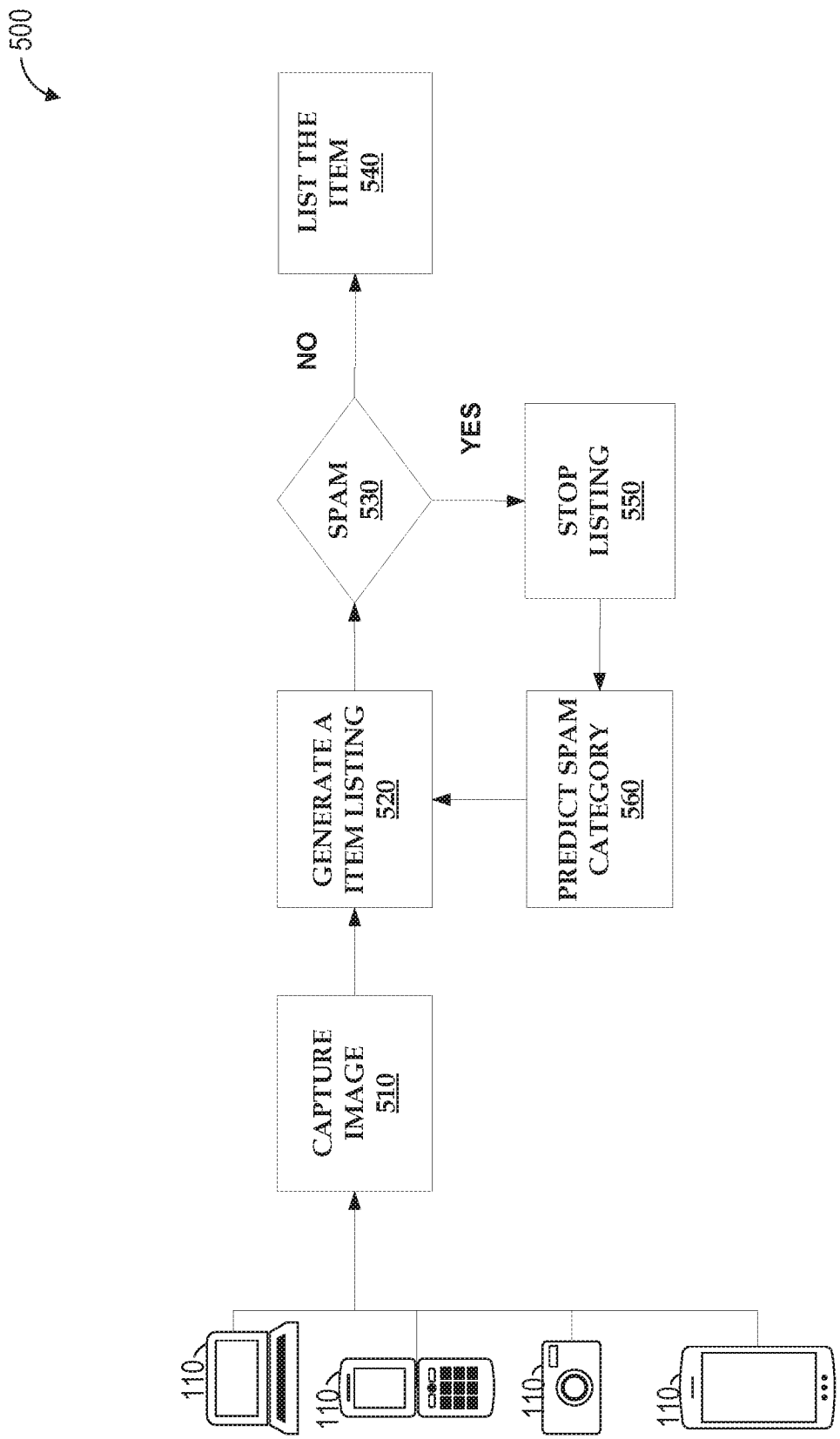
FIG. 5 illustrates an example selling flow process using the spam detection system, according to some embodiments.
Figure 6:
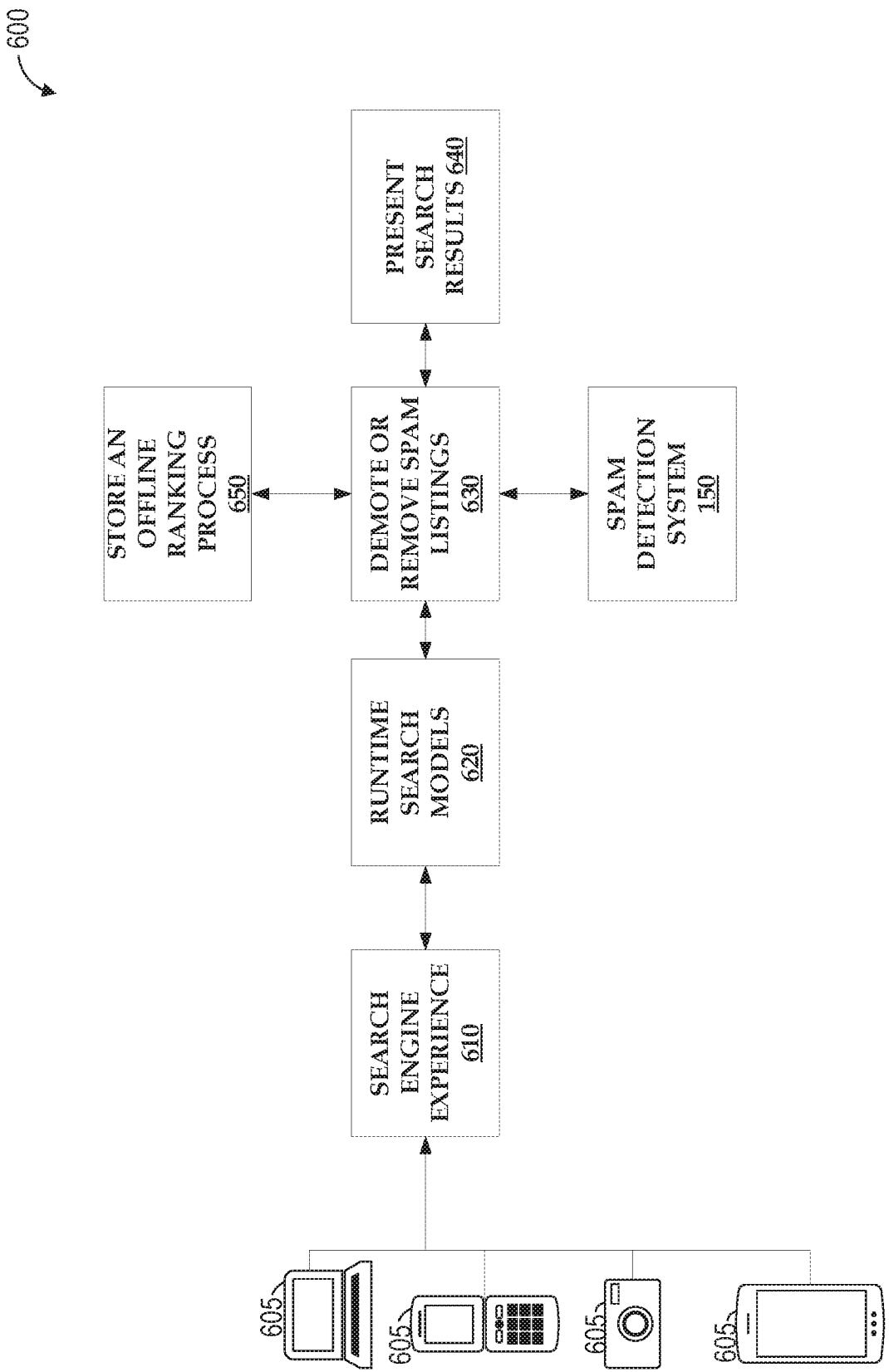
FIG. 6 illustrates an example search flow process using the spam detection system, according to some embodiments.

According to some embodiments, the spam detection system 150 can be incorporated in a selling flow process of the online marketplace and in the search flow process of the online marketplace. FIG. 5 illustrates an example selling flow process 500 using the spam detection system 150, according to some embodiments. FIG. 6 illustrates an example search flow process 600 using the spam detection system 150, according to some embodiments.

In the selling flow 500 example, a seller lists an item in the marketplace for sale. At operation 510, the seller captures an image of an item that is going to be listed for sale. For example, the image can be captured using the user device 110 (e.g., laptop, smartphone, camera, and tablet).

At operation 520, the seller generates an item listing by uploading images of the item and item attributes (e.g., title, item category, brand, model, size, color) to the application server 140. The images and the item attributes can be received by the application server 140 from the user device 110. The listing generation module 250 takes the images and item attributes and generates the item listing.

At operation 530, the generated item listing is sent to the spam detection system 150 to determine whether the generated listing is spam. For example, an image attribute (e.g., title, item category and item attributes) is extracted by the spam detection system 150 and sent to the machine-learned model to determine the accuracy of an item attribute that is inputted by a user. The image attributes and the item attributes are compared by the spam detection system 150 to determine whether the listing is spam. Additionally, the spam detection system 150 determines the accuracy of the item attributes inputted by the seller. As later discussed, FIG. 7 is a flowchart illustrating an example method of determining whether an item listing is spam, in accordance with an example embodiment.

When it is determined that the generated item listing is not spam at operation 530, the publication system 142 or spam detection system 150 causing the item listing to be listed on the online marketplace at operation 540. Alternatively, when it is determined that the generated item listing is spam at operation 530, the publication system 142 or spam detection system 150 prevents the publication from being published on the generated listing on the online marketplace at operation 550. Additionally, after operation 550, the spam detection system 150 can determine the spam category using a rule engine prediction model at operation 560. The rule engine prediction model is updated based on information received or derived from the generated listing. For example, the rule engine prediction model can determine whether an image, an item attribute (e.g., brand, color), or a category listing is incorrect. A notification of the predicted incorrect information is sent to the seller using the notification management module 270. The sell may correct the incorrect information, in order for the application server 140 to remove the spam classifier and publish the item listing in the online marketplace.

Often times in conventional systems, when spam listings are present in the search results, it can diminish the customer experience. Hence, using the techniques described herein, the spam detection system 150 detects a spam listing, and demote or remove the spam items from the final ranked results displayed to the user 106.

Referring now to FIG. 6, in the search flow 600 example, a user (e.g., buyer) can search for an item to purchase at operation 610. The search request is sent by the user using another user device 605. The other user device 605 can be similar to user device 110 but used by a buyer. At operation 620, the application server 140 can run search models to identify a top-ranked list of items to be shown to the user based on the search request. Subsequently, the spam detection system 150 classifies each item listing as spam or not spam based on the images from the top-ranked list of items. The search results can be based on a ranking of items, where a spam listing can either be demoted in ranking or can be removed from the search results, at operation 630. For example, the spam detection system 150 can classify an item listed for sale on the online marketplace as a spam listing based on the method described in FIG. 5 and FIG. 7. When the item is classified as spam, the runtime search models can use this information to either demote or remove the item from the top-ranked list of items. Alternatively, the spam detection system 150 can store an offline ranking process at operation 650 to expedite the search process. For example, the publications can be ranked and stored in an offline ranking database. The offline ranking database can be used to determine the accuracy of each listed item offline, thereby expediting the runtime search result.

At operation 640, the application server 140 presents the search results ranking to the user using a model feature computation technique. For example, when the user issues a search request (e.g., search query) to browse through a list of items present in the online marketplace, the search engine returns a ranked list of items based on factors and pre-trained machine learned models. As previously described at operation 630, the spam listings can be demoted or removed from the search results presented at operation 640.

FIG. 7 is a flowchart illustrating an example method 700 of determining the accuracy of information associated with an item listed for sale, in accordance with an example embodiment. In this embodiment, the method 700 includes operations such as receiving an image and an item attribute (operation 710), extracting an image attribute (operation 720), calculating a confidence score based on the item attribute and image attribute (operation 730), determining the item attribute is incorrect based on the confidence score (operation 740), and presenting a notification based on the comparison (operation 750). The example method 700 will be described below, by way of explanation, as being performed by certain modules. It will be appreciated, however, that the operations of the example method 700 can be performed in any suitable order by any number of the modules shown in FIG. 2 and FIG. 9. Unless specifically stated otherwise, the terms "a" or "an" are herein used, as is common in patent documents, to include one or more than one instance. Finally, as used herein, the conjunction "or" refers to a non-exclusive "or," such as "and/or," unless specifically stated otherwise.

In an example embodiment, the method 700 starts at operation 710, in which the spam detection system 150 receives from user device 110 an image (e.g., uploaded image 310 in FIG. 3) for an item to be listed for sale in an online marketplace. Additionally, the spam detection system 150 receives an item attribute (e.g., item attribute 330 in FIG. 3) for the item. In some instances, the image or the item attribute can be receive from the vendor server 130 or another device connected to the network 104. For example, the image or item attribute can be transmitted by the user device 110, by an API on the user device 110, by the user 106, by the vendor server 130, or by the network. In some instances, the image and the item attribute is received by the application interface module 210 of FIG. 2.

In some instances, the item attribute comprises a category classifier. For example, a seller can incorrectly list a smartphone case in the smartphone category. As further described in method 700 and method 800, based on the confidence score, the spam detection system 150 can determine that the correct category classifier for the case is smartphone accessories.

At operation 720, the spam detection system 150 extracts an image attribute based on the image received at operation 710. Operations 320 and 340 describe examples of the extraction performed at operation 720. In some instances, the extraction is performed by the image extraction module 230 of FIG. 2.

At operation 730, the spam detection system 150 calculates, using a processor, a confidence score based on a comparison of the item attribute and the image attribute. The image attribute can be obtained at operation 720, and the item attribute can be received at operation 710. For example, the comparison uses an overlap technique to determine the likelihood that the image attribute and the item attribute are the same or similar. In some instances, there is a range that the item attribute can be within in order to match the image attribute. Similarly, there is a range that the image attribute can be within in order to match the item attribute. For example, when the image attribute is determined to be logo for a first brand name, and the item attribute is a second brand name, then the calculated confidence score can be high (e.g., more than 0.1) to indicate that the item attribute is incorrect. Alternatively, when the image attribute is determined to be logo for a first brand name, and the item attribute is the first brand name, then the calculated confidence score can be low (e.g., less than 0.1) to indicate that the item attribute is correct. Additionally, when the confidence score is higher than a second predetermined threshold (e.g., more than 0.5) then the listing can be determined to be spam.

Process 300 in FIG. 3 describes techniques for comparing the image attribute and the item attribute to calculate a confidence score. Additionally, method 800 in FIG. 8 further describes techniques for calculating the confidence score, in accordance to some embodiments. The processor can be included in the confidence score calculation module 260. In some instances, the processor can be processor 902 later described in FIG. 9. In some instances, the comparison is based on an overlap technique.

At operation 740, the spam detection system 150 determines that the item attribute is incorrect based on the confidence score transgressing a predetermined threshold. For example, when a first predetermined threshold is 0.1 and the confidence score is higher than then the spam detection system 150 classifies the item attribute as incorrect. In some instances, when the item attribute is incorrect, the item listing can simply be demoted in the search results ranking as illustrated at operation 630 of FIG. 6. In some instances, the determination at operation 740 is performed by the comparison module 240 and the confidence score calculation module of FIG. 2.

Additionally, when the confidence score transgresses a second predetermined threshold, then the listing can be classified as a spam listing. In one embodiments, the second predetermined threshold is higher than the predetermined threshold at operation 740. Continuing with the example at operation 740, when a second predetermined threshold is 0.5 and the confidence score is higher than 0.5, then the spam detection system 150 can classify the item listing as spam. In some instances, when the item listing is classified as spam, the item listing can be removed from the search results ranking as illustrated at operation 630 of FIG. 6.

Moreover, the determination at operation 740 can further determine the type of incorrect information associated with the item listing. The type of incorrect information can include an incorrect image, an incorrect item category, an incorrect item attribute (e.g., brand name, color), and so on.

In response to the determination that the item attribute is incorrect at operation 740, the spam detection system 150 causes presentation, on a display of the user device 110, a notification at operation 750. For example, the notification can include a message to the user 106 of the user device 110 to revise the incorrect item attribute to a suggested attribute based on the image attribute. In some instances, the notification message is sent by the notification management module 270 of FIG. 2.

In some instances, the notification can indicate that the image is incorrect, that a listing category associated with the item listed for sale is incorrect, that a brand associated with the item is incorrect, or that a color associated with the item is incorrect.

In some instances, the notification comprises a request to change the item attribute to a new attribute. Additionally, the spam detection system 150 can be further configured to receive a response to change the item attribute to the new attribute; change the item attribute to a new attribute based on the received confirmation; or publish the item listed for sale with the new attribute on the online marketplace. For example, the new attribute can be based on the image attribute. Alternatively, the new attribute is based on a suggested item attribute (e.g., neighbor attribute), the suggested item attribute being derived from another item listed for sale that is similar to the item listed for sale. The other item listed for sale that is similar to the item listed for sale can be accessed from the item database 126 using the data storage interface module 220.

In some instances, the spam detection system 150 can receive a denial to change the item attribute to a new attribute; and remove the item listed for sale from the online marketplace based on the received denial.

In some instances, the spam detection system 150 can be further configured to receive, from another device, a search request, the search request associated with the item attribute. The span) detection system 150 generates a search result associated with the item attribute in response to the search request, the search result having a list of items, and remove the item listed for sale from the list of items based on the determination that the item attribute for the item listed for sale is incorrect. For example, the spam detection system 150 using the publication system 142 can generate the search results. The publication system 142 can generates the search results, and the spam detection system 150 can update the search results by removing or demoting an item listed for sale from the list of items.

Additionally, the notification management module 270 can notify the user 106 that the item listing is being generated and being automatically posted on the online marketplace based on an indication received from the user device 110 to update the incorrect item attribute. The notification message can be, but is not limited to, a text message, a phone call, an email, and other types of messages. Additionally, the spam detection system 150 can cause presentation of, on a display of user device 110, the notification message.

Furthermore, the notification management module 270 can present to the user device 110 the type of incorrect information associated with the item listing based on the determination at operation 740. The type of incorrect information can include an incorrect image, an incorrect item category, an incorrect item attribute (e.g., brand name, color), and so on.

In some instances, the spam detection system 150, in response to the received indication from user device 110 to update the item listing, can generate the listing for the item on the online marketplace using the updated item information.

In some instances, the user 106 initiates an authentication process via a website or an application of the online marketplace. It will be appreciated that, in example embodiments, the user 106 generates authentication requests in a number of additional or alternative ways. For example, the online marketplace links the spam detection system 150 such that when the user 106 requests to sign in for listing services, the online marketplace transfers the user 106 to the spam detection system 150 for authentication. That is, in example embodiments, the spam detection system 150 provides a webpage to the user 106 for authenticating the user 106 instead of the online marketplace of the vendor server 130. Thus, the spam detection system 150 directly prompts the user 106 for authentication requests, receives authentication requests, processes authentication requests, and provides to the vendor server 130 the results (e.g., pass or fail) of the authentication. In another example, an application (e.g., a software application for a mobile device or a desktop computer) executed on the user device 110 provides a GUI to the user 106 for authenticating the user 106. The application corresponds to a software application dedicated to the online marketplace for providing direct access to the spam detection system 150. The spam detection system 150 receives authentication data from the application, processes the application data, and returns the results to the application.

Figure 8:
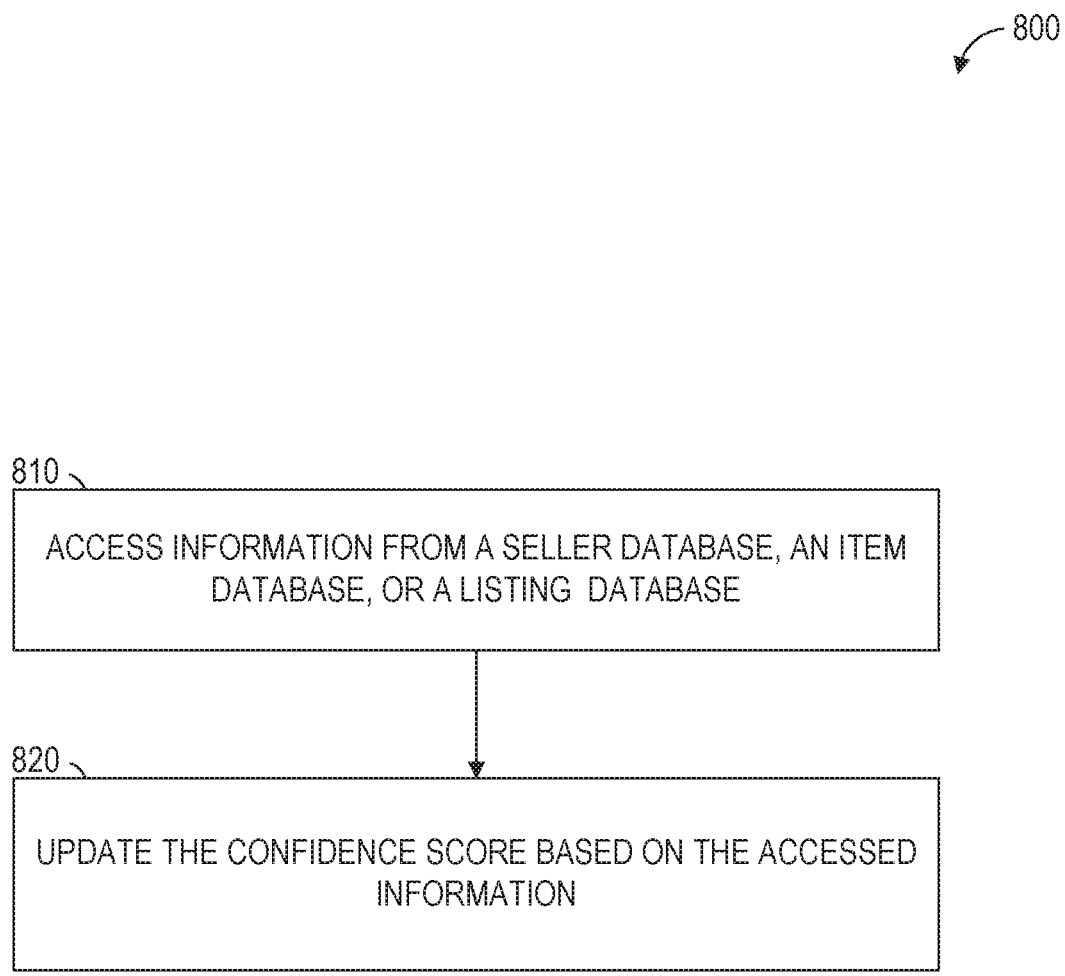
FIG. 8 is flowchart illustrating an example method of calculating the confidence score used for determining the accuracy of information in FIG. 7, according to some embodiments.

FIG. 8 is a flowchart illustrating an example method 800 of calculating the confidence score used at operation 730 of FIG. 7. The confidence score is used for determining the accuracy of information in FIG. 7, according to some embodiments. The method 800 will be described below, by way of explanation, as being performed by certain modules. It will be appreciated, however, that the operations of the method 800 can be performed in any suitable order by any number of the modules shown in FIG. 2.

At operation 810, the spam detection system 150, using the data storage interface module 220, accesses additional information from the seller database 127, the item database 126, or the listing database 128.

The listing database 128 can include a price database with sale price data. The sale price data can include a price range and an average price of an item based on quality, condition, or location. For example, the sale price data can include historical sale price information for the listed item. Additionally, the sale price data can include sale price information for the past twelve months, or another timeframe. The timeframe can be predetermined by the spam detection system 150 or selected by the user 106.

In some instances, the spam detection system 150 accesses, using a user identifier, seller information about the seller from the seller database 127. For example, the user identifier can be received from the user device 110 along with the other information received at operation 710 of method 700. As previously mentioned, the seller information in the seller database 127 include the seller's rating based on previous transactions, the number of positive feedback received by the seller, the number of negative feedback received, communication messages with buyers or potential buyers, the number of items previously sold, the number of items correctly shipped, the number of refunds requested or given, or other derived information. For example, other derived information can include a sentiment analysis based on buyer's feedback. The sentiment analysis can be based on text recognition techniques used to determine the buyer's feedback.

Additionally, the listing database 128 can include product information and product description for the specific item. According to some embodiments, the spam detection system 150 can use item attributes of similarly listed items to determine the accuracy of the item attributed received at operation 710. Furthermore, the spam detection system 150 can suggest a suggested item attribute for the item listed for sale based on the information accessed from the item database 126 at operation 810.

At operation 820, the spam detection system 150, can update the confidence score based on the accessed information. The confidence score can be updated based on seller information (e.g., seller's reputation score), a suggested item attribute, or a suggested price. Operation 820 can be performed by a processor configured by the confidence score calculation module 260. In some instances, the processor can be the processor 902 later described in FIG. 9.

In some instances, the spam detection system 150 can access, from the seller database 127, seller information of a seller listing the item. Additionally, the spam detection system 150 can update the confidence score based on the seller information. The seller information can include information related to positive feedback, number of messages with customer, bad buyer experience, number of previously sold items, number of refund requests, item shipped correctly, and so on.

In some instances, the spam detection system 150 can access, from an item database 126, a suggested item attribute for the item listed for sale, and update the confidence score based on the suggested item attribute. In some instances, the suggested item attribute is obtained from a similar item listing. For example, the item listed for sale is a purse having a first brand name, and the similar item listing is another item listing for a similar purse having the same first brand name. The suggested item attribute can be obtain from the description of the similar item listing. Therefore, when the suggested item attribute is similar to the item attribute, then confidence score that the item attribute is inaccurate is decreased. Alternatively, when the suggested item attribute is not similar to the item attribute, then confidence score that the item attribute is inaccurate is increased.

In some instances, the spam detection system 150 can access, from a listing database 128 or price database, a suggested price for the item listed for sale, and update the confidence score based on the suggested price. The suggested price can include an average price or a price range for a similar item listing. For example, if the item listed for sale is categorized as a smartphone but the price is lower (e.g., outside the price range) than the average price of similar smartphones listed in the online marketplace, then the confidence score that the item attribute (e.g., item category) is inaccurate is decreased. When the price is outside the price range, then the item listed may be in the wrong category, since the item is determined to be a smartphone case instead of an actual smartphone.

In some instances, the spam detection system 150 can access, from an offline ranking database, a spam detection classifier associated with the item attribute, wherein the comparison is further based on a spam detection classifier. For example, the offline ranking database 650 in FIG. 6 can include a spam detection classifier associate with an item attribute or an item listing.

Figure 9:
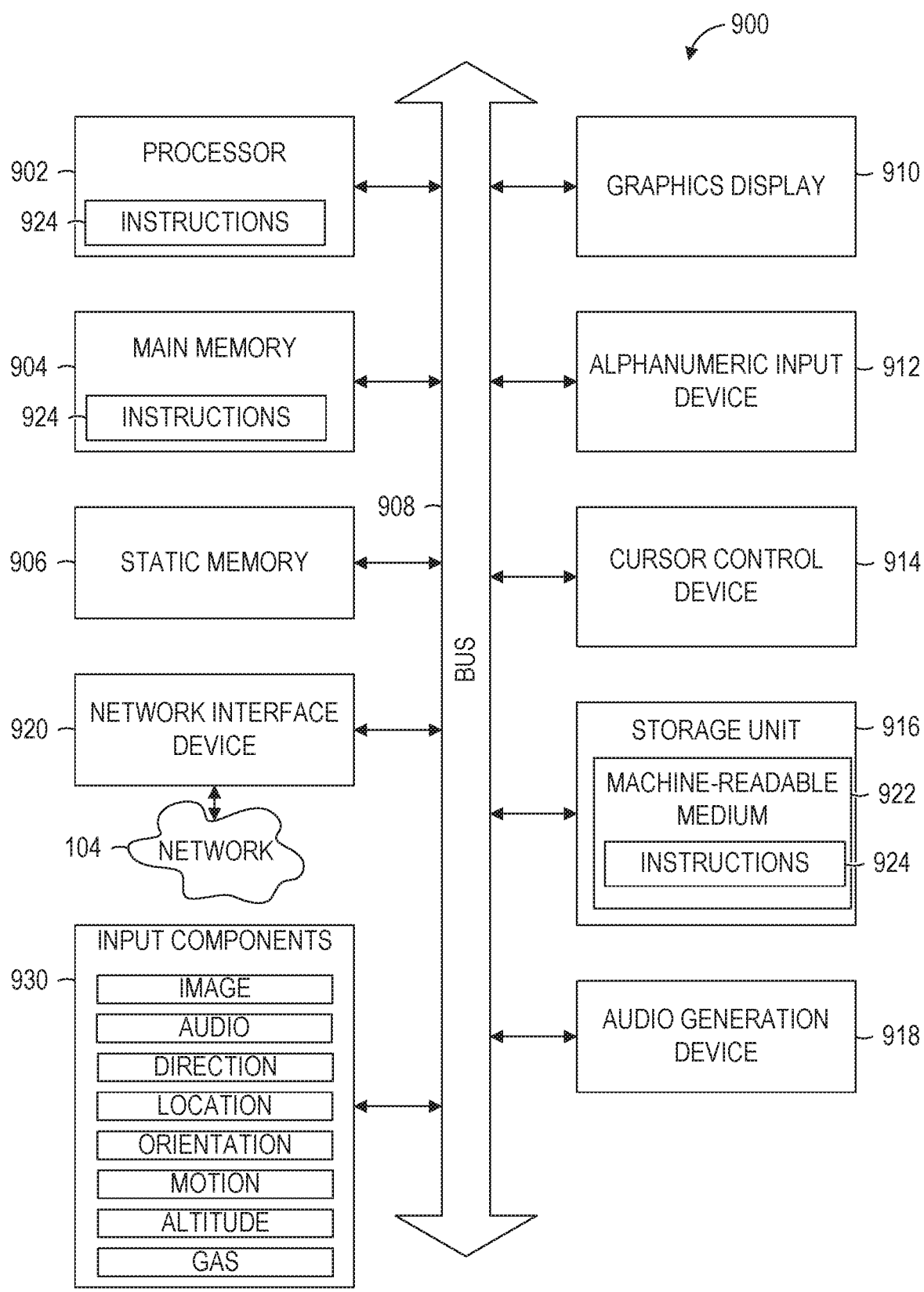
FIG. 9 is a block diagram illustrating components of a machine, according to some example embodiments, able to read instructions from a machine-readable medium and perform any one or more of the methodologies discussed herein.

FIG. 9 is a block diagram illustrating components of a machine 900, according to some example embodiments, able to read instructions 924 from a machine-readable medium 922 (e.g., a non-transitory machine-readable medium, a machine-readable storage medium, a computer-readable storage medium, or any suitable combination thereof) and perform any one or more of the methodologies discussed herein, in whole or in part. Specifically, FIG. 9 shows the machine 900 in the example form of a computer system (e.g., a computer) within which the instructions 924 (e.g., software, a program, an application, an apples, an app, or other executable code) for causing the machine 900 to perform any one or more of the methodologies discussed herein may be executed, in whole or in part. The spam detection system 150 can be an example of the machine 900.

In alternative embodiments, the machine 900 operates as a standalone device or may be connected (e.g., networked) to other machines. In a networked deployment, the machine 900 may operate in the capacity of a server machine or a client machine in a server-client network environment, or as a peer machine in a distributed (e.g., peer-to-peer) network environment. The machine 900 may be a server computer, a client computer, a personal computer (PC), a tablet computer, a laptop computer, a netbook, a cellular telephone, a smartphone, a set-top box (STB), a personal digital assistant (PDA), a web appliance, a network router, a network switch, a network bridge, or any machine capable of executing the instructions 924, sequentially or otherwise, that specify actions to be taken by that machine. Further, while only a single machine is illustrated, the term "machine" shall also be taken to include any collection of machines that individually or jointly execute the instructions 924 to perform all or part of any one or more of the methodologies discussed herein.

The machine 900 includes a processor 902 (e.g., a central processing unit (CPU), a graphics processing unit (GPU), a digital signal processor (DSP), an application specific integrated circuit (ASIC), a radio-frequency integrated circuit (RFIC), or any suitable combination thereof), a main memory 904, and a static memory 906, which are configured to communicate with each other via a bus 908. The processor 902 may contain microcircuits that are configurable, temporarily or permanently, by some or all of the instructions 924 such that the processor 902 is configurable to perform any one or more of the methodologies described herein, in whole or in part. For example, a set of one or more microcircuits of the processor 902 may be configurable to execute one or more modules (e.g., software modules) described herein.

The machine 900 may further include a graphics display 910 (e.g., a plasma display panel (PDP), a light emitting diode (LED) display, a liquid crystal display (LCD), a projector, a cathode ray tube (CRT), or any other display capable of displaying graphics or video). The machine 900 may also include an alphanumeric input device 912 (e.g., a keyboard or keypad), a cursor control device 914 (e.g., a mouse, a touchpad, a trackball, a joystick, a motion sensor, an eye tracking device, or other pointing instrument), a storage unit 916, an audio generation device 918 (e.g., a sound card, an amplifier, a speaker, a headphone jack, or any suitable combination thereof), and a network interface device 920.

The storage unit 916 includes the machine-readable medium 922 (e.g., a tangible and non-transitory machine-readable storage medium) on which are stored the instructions 924 embodying any one or more of the methodologies or functions described herein. The instructions 924 may also reside, completely or at least partially, within the main memory 904, within the processor 902 (e.g., within the processor's cache memory), or both, before or during execution thereof by the machine 900. Accordingly, the main memory 904 and the processor 902 may be considered machine-readable media 922 (e.g., tangible and non-transitory machine-readable media). The instructions 924 may be transmitted or received over the network 34 via the network interface device 920. For example, the network interface device 920 may communicate the instructions 924 using any one or more transfer protocols (e.g., hypertext transfer protocol (HTTP)).

The machine-readable medium 922 may include a magnetic or optical disk storage device, solid state storage devices such as flash memory, or other non-volatile memory device or devices. The computer-readable instructions 924 stored on the computer-readable storage medium 922 are in source code, assembly language code, object code, or another instruction format that is interpreted by one or more processors 902.

In some example embodiments, the machine 900 may be a portable computing device, such as a smartphone or tablet computer, and have one or more additional input components 930 (e.g., sensors or gauges). Examples of such input components 930 include an image input component (e.g., one or more cameras), an audio input component (e.g., a microphone), a direction input component (e.g., a compass), a location input component (e.g., a global positioning system (GPS) receiver), an orientation component (e.g., a gyroscope), a motion detection component (e.g., one or more accelerometers), an altitude detection component (e.g., an altimeter), and a gas detection component (e.g., a gas sensor). Inputs harvested by any one or more of these input components may be accessible and available for use by any of the modules described herein.

As used herein, the term "memory" refers to a machine-readable medium 922 able to store data temporarily or permanently and may be taken to include, but not be limited to, random-access memory (RAM), read-only memory (ROM), buffer memory, flash memory, and cache memory. While the machine-readable medium 922 is shown, in an example embodiment, to be a single medium, the term "machine-readable medium" should be taken to include a single medium or multiple media (e.g., a centralized or distributed database, or associated caches) able to store the instructions 924. The term "machine-readable medium" shall also be taken to include any medium, or combination of multiple media, that is capable of storing the instructions 924 for execution by the machine 900, such that the instructions 924, when executed by one or more processors 902 of the machine 900 (e.g., the processor 902), cause the machine 900 to perform any one or more of the methodologies described herein, in whole or in part. Accordingly, a "machine-readable medium" refers to a single storage apparatus or device, as well as cloud-based storage systems or storage networks that include multiple storage apparatus or devices. The term "machine-readable medium" shall accordingly be taken to include, but not be limited to, one or more tangible (e.g., non-transitory, excluding signals) data repositories in the form of a solid-state memory, an optical medium, a magnetic medium, or any suitable combination thereof.

The foregoing description, for purposes of explanation, has been described with reference to specific embodiments. However, the illustrative discussions above are not intended to be exhaustive or to limit the present disclosure to the precise forms disclosed. Many modifications and variations are possible in view of the above teachings. The embodiments were chosen and described in order to best explain the principles of the present disclosure and its practical applications, to thereby enable others skilled in the art to best utilize the present disclosure and various embodiments with various modifications as are suited to the particular use contemplated.

Throughout this specification, plural instances may implement components, operations, or structures described as a single instance. Although individual operations of one or more methods are illustrated and described as separate operations, one or more of the individual operations may be performed concurrently, and the operations can be performed in a different order than illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Certain embodiments are described herein as including logic or a number of components, modules, or mechanisms. Modules may constitute software modules (e.g., code stored or otherwise embodied on a machine-readable medium 922 or in a transmission medium), hardware modules, or any suitable combination thereof. A "hardware module" is a tangible (e.g., non-transitory) unit capable of performing certain operations and may be configured or arranged in a certain physical manner. In various example embodiments, one or more computer systems (e.g., a standalone computer system, a client computer system, or a server computer system) or one or more hardware modules of a computer system (e.g., a processor or a group of processors 902) may be configured by software (e.g., an application or application portion) as a hardware module that operates to perform certain operations as described herein.

In some embodiments, a hardware module may be implemented mechanically, electronically, or any suitable combination thereof. For example, a hardware module may include dedicated circuitry or logic that is permanently configured to perform certain operations. For example, a hardware module may be a special-purpose processor, such as a field programmable gate array (FPGA) or an ASIC. A hardware module may also include programmable logic or circuitry that is temporarily configured by software to perform certain operations. For example, a hardware module may include software encompassed within a general-purpose processor 902 or other programmable processor 902. It will be appreciated that the decision to implement a hardware module mechanically, in dedicated and permanently configured circuitry, or in temporarily configured circuitry (e.g., configured by software) may be driven by cost and time considerations.

Accordingly, the phrase "hardware module" should be understood to encompass a tangible entity, and such a tangible entity may be physically constructed, permanently configured (e.g., hardwired), or temporarily configured (e.g., programmed) to operate in a certain manner or to perform certain operations described herein. As used herein, "hardware-implemented module" refers to a hardware module. Considering embodiments in which hardware modules are temporarily configured (e.g., programmed), each of the hardware modules need not be configured or instantiated at any one instance in time. For example, where a hardware module comprises a general-purpose processor 902 configured by software to become a special-purpose processor, the general-purpose processor 902 may be configured as respectively different special-purpose processors (e.g., comprising different hardware modules) at different times. Software (e.g., a software module) may accordingly configure one or more processors 902, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple hardware modules exist contemporaneously, communications may be achieved through signal transmission (e.g., over appropriate circuits and buses) between or among two or more of the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and can operate on a resource (e.g., a collection of information).

The various operations of example methods described herein may be performed, at least partially, by one or more processors 902 that are temporarily configured (e.g., by software) or permanently configured to perform the relevant operations. Whether temporarily or permanently configured, such processors 902 may constitute processor-implemented modules that operate to perform one or more operations or functions described herein. As used herein, "processor-implemented module" refers to a hardware module implemented using one or more processors 902.

Similarly, the methods described herein may be at least partially processor-implemented, a processor 902 being an example of hardware. For example, at least some of the operations of a method may be performed by one or more processors 902 or processor-implemented modules. As used herein, "processor-implemented module" refers to a hardware module in which the hardware includes one or more processors 902. Moreover, the one or more processors 902 may also operate to support performance of the relevant operations in a "cloud computing" environment or as a "software as a service" (SaaS). For example, at least some of the operations may be performed by a group of computers (as examples of machines including processors 902), with these operations being accessible via a network 104 (e.g., the Internet) and via one or more appropriate interfaces (e.g., an application program interface (API)).

The performance of certain operations may be distributed among the one or more processors 902, not only residing within a single machine, but deployed across a number of machines. In some example embodiments, the one or more processors 902 or processor-implemented modules may be located in a single geographic location (e.g., within a home environment, an office environment, or a server farm). In other example embodiments, the one or more processors 902 or processor-implemented modules may be distributed across a number of geographic locations.

Some portions of the subject matter discussed herein may be presented in terms of algorithms or symbolic representations of operations on data stored as bits or binary digital signals within a machine memory (e.g., a computer memory). Such algorithms or symbolic representations are examples of techniques used by those of ordinary skill in the data processing arts to convey the substance of their work to others skilled in the arts. As used herein, an "algorithm" is a self-consistent sequence of operations or similar processing leading to a desired result. In this context, algorithms and operations involve physical manipulation of physical quantities. Typically, but not necessarily, such quantities may take the form of electrical, magnetic, or optical signals capable of being stored, accessed, transferred, combined, compared, or otherwise manipulated by a machine. It is convenient at times, principally for reasons of common usage, to refer to such signals using words such as "data," "content," "bits," "values," "elements," "symbols," "characters," "terms," "numbers," "numerals," or the like. These words, however, are merely convenient labels and are to be associated with appropriate physical quantities.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or any suitable combination thereof), registers, or other machine components that receive, store, transmit, or display information. Furthermore, unless specifically stated otherwise, the terms "a" or "an" are herein used, as is common in patent documents, to include one or more than one instance. Finally, as used herein, the conjunction "or" refers to a non-exclusive "or," such as "and/or," unless specifically stated otherwise.

What is claimed is:

1. A method comprising:
receiving, by a detection system from a device, an upload of an image for an item for sale in an online marketplace;
receiving, by the detection system, an item attribute for the item, the item attribute comprising a description of the item inputted by a user on the device;
extracting, by the detection system using an image extraction technique, an image attribute from the uploaded image;
comparing, by a machine-trained language model of the detection system, the item attribute comprising the description of the item and the image attribute;
calculating, using a processor of the detection system, a confidence score based on the comparing, the confidence score representing an amount of overlap between the item attribute and the image attribute based on either a basic similarity measure or a machine-learned classifier;
determining, by the detection system, that the item attribute is incorrect based on the confidence score transgressing a first predetermined threshold;
classifying, by the detection system, an item publication for the item as spam based on the confidence score transgressing a second predetermined threshold, the second predetermined threshold being different from the first predetermined threshold;
in response to the determining that the item attribute is incorrect, causing presentation, on a display of the device, of a notification comprising a request to change the item attribute to a new attribute, the new attribute comprising a suggested item attribute derived by the detection system and based on a second item listed for sale in the online marketplace;
receiving, by the detection system from the device, an indication to change the item attribute to the new attribute; and
publishing to the online marketplace, automatically in response to changing the item attribute to the new attribute, the item publication for the item with the new attribute.

2. The method of claim 1, further comprising:
accessing, from a seller database, seller information of a seller listing the item; and
updating the confidence score based on the seller information.

3. The method of claim 1, further comprising:
accessing, from an item database, a suggested item attribute for the item listed for sale; and
updating the confidence score based on the suggested item.

4. The method of claim 1, further comprising:
accessing, from a price database, a suggested price for the item listed for sale; and
updating the confidence score based on the suggested price.

5. The method of claim 1, wherein:
the basic similarity measures comprise a cosine similarity, hashing functions, or Jaccard similarity; and
the machine-learned classifier is based on a SVM model, logistic regression model, or a neural networks model.

6. The method of claim 1, further comprising:
accessing, from an offline ranking database, a spam detection classifier associated with the item attribute, and wherein the comparison is further based on the spam detection classifier.

7. The method of claim 1, further comprising:
in response to receiving the indication, changing the item attribute to the new attribute.

8. The method of claim 1, further comprising training a classifier to determine a likelihood that the publication for the item is spam or the item attribute is incorrect.

9. The method of claim 1, wherein the new attribute is based on a neighbor attribute, the neighbor attribute being derived from another item that is similar to the item.

10. The method of claim 1, further comprising:
receiving a denial to change the item attribute to the new attribute; and
in response to receiving the denial, removing the publication of the item.

11. The method of claim 1, further comprising:
receiving, from a second device, a search request, the search request associated with the item attribute;
generating a search result associated with the item attribute in response to the search request, the search result comprising a plurality of publications of items; and
removing the publication for the item from the search result based on the determining that the item attribute for the item is incorrect.

12. The method of claim 1, wherein the notification indicates that the image is incorrect.

13. The method of claim 1, wherein the notification indicates that a listing category associated with the item is incorrect.

14. The method of claim 1, wherein the notification indicates that a brand associated with the item is incorrect, or a color associated with the item is incorrect.

15. The method of claim 1, wherein the second predetermined threshold is greater than the first predetermined threshold.

16. A non-transitory machine-readable storage medium comprising instructions that, when executed by one or more processors of a machine, cause the machine to perform operations comprising:
receiving, from a device, an upload of an image for an item for sale in an online marketplace;
receiving an item attribute for the item, the item attribute comprising a description of the item inputted by a user on the device;
extracting, using an image extraction technique, an image attribute from the uploaded image;
comparing, by a machine-trained language model of the detection system, the item attribute comprising the description of the item and the image attribute;
calculating, using a processor, a confidence score based on the comparing, the confidence score representing an amount of overlap between the item attribute and the image attribute based on either a basic similarity measure or a machine-learned classifier;
determining, by the detection system, that the item attribute is incorrect based on the confidence score transgressing a first predetermined threshold;
classifying, by the detection system, an item publication for the item as spam based on the confidence score transgressing a second predetermined threshold, the second predetermined threshold being different from the first predetermined threshold;
in response to the determining that the item attribute is incorrect, causing presentation, on a display of the device, of a notification comprising a request to change the item attribute to a new attribute, the new attribute comprising a suggested item attribute derived by the detection system and based on a second item listed for sale in the online marketplace;
receiving, by the detection system from the device, an indication to change the item attribute to the new attribute; and
publishing to the online marketplace, automatically in response to changing the item attribute to the new attribute, the item publication for the item with the new attribute.

17. The storage medium of claim 16, wherein the operations further comprise:
accessing, from a seller database, the seller information;
accessing, from an item database, the suggested item attribute for the item listed for sale;
accessing, from a listing database, a suggested price for the item listed for sale; and
updating the confidence score based on at least one of the seller information, the suggested item attribute, or the suggested price.

18. A detection system comprising:
one or more processors; and
a memory storing instructions that, when executed by the one or more processors, cause the system to perform operations comprising:
receiving, from a device, an upload of an image for an item for sale in an online marketplace and an item attribute for the item, the item attribute comprising a description of the item inputted by a user on the device;
extracting, using an image extraction technique, an image attribute from the uploaded image;
comparing, by a machine-trained language model of the detection system, the item attribute comprising the description of the item and the image attribute;
calculating a confidence score based on the comparison, the confidence score representing an amount of overlap between the item attribute and the image attribute based on either a basic similarity measure or a machine-learned classifier;
determining, by the detection system, that the item attribute is incorrect based on the confidence score transgressing a first predetermined threshold;
classifying, by the detection system, an item publication for the item as spam based on the confidence score transgressing a second predetermined threshold, the second predetermined threshold being different from the first predetermined threshold;
in response to the determination determining that the item attribute is incorrect, causing presentation, on a display of the device, of a notification comprising a request to change the item attribute to a new attribute, the new attribute comprising a suggested item attribute derived by the detection system and based on a second item listed for sale in the online marketplace;

receiving, by the detection system from the device, an indication to change the item attribute to the new attribute; and publishing to the online marketplace, automatically in response to changing the item attribute to the new attribute, the item publication for the item with the new attribute.

19. The detection system of claim 18, wherein the operations further comprise:

accessing, from a seller database, the seller information;

accessing, from an item database, the suggested item attribute for the item listed for sale;

accessing, from a listing database, a suggested price for the item listed for sale; and updating the confidence score based on at least one of the seller information, the suggested item attribute, or the suggested price.

* * * * *